No. 621,524. Patented Mar. 21, 1899.
W. H. GORDON.
MITER BOX.
(Application filed June 24, 1898.)
(No Model.) 2 Sheets—Sheet 1.

Witnesses
Inventor
William H. Gordon
by Kiesler
Attorney

No. 621,524. Patented Mar. 21, 1899.
W. H. GORDON.
MITER BOX.
(Application filed June 24, 1898.)
(No Model.) 2 Sheets—Sheet 2.
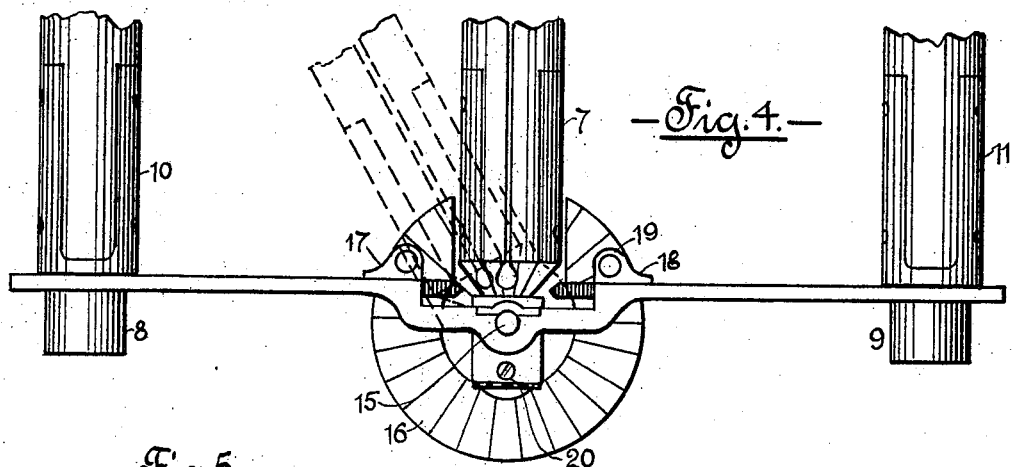
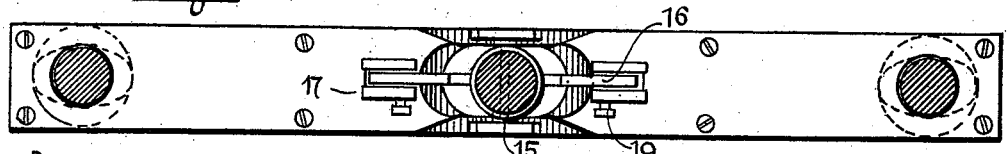
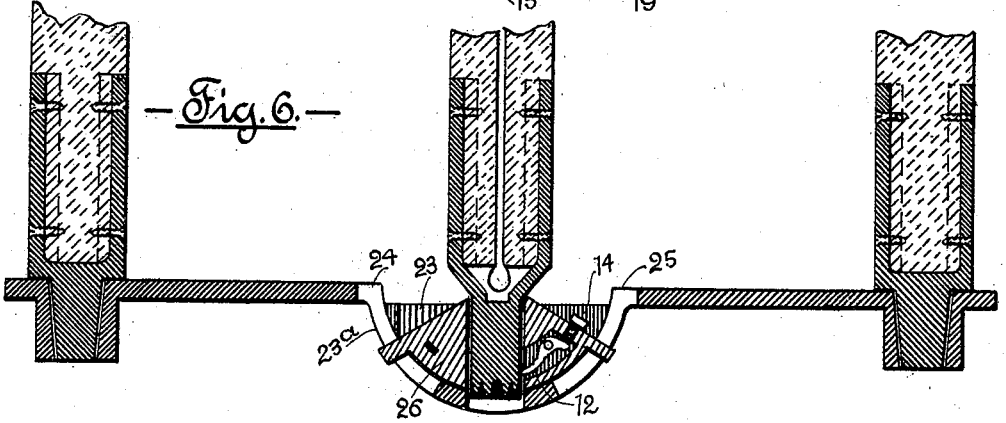
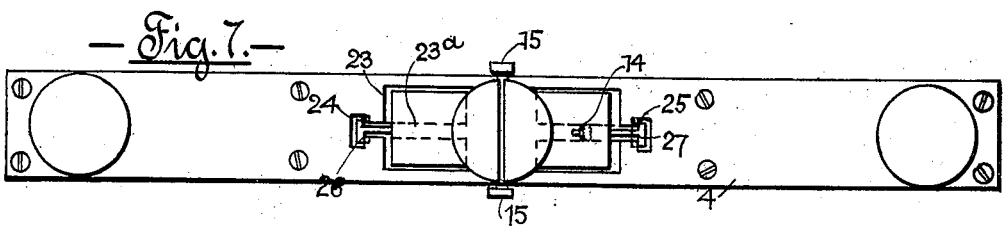
Witnesses.
Inventor
William H. Gordon
by F. Geisler
Attorney

UNITED STATES PATENT OFFICE.

WILLIAM H. GORDON, OF PORTLAND, OREGON, ASSIGNOR OF ONE-THIRD TO EDWIN R. KIMBLE, OF SAME PLACE.

MITER-BOX.

SPECIFICATION forming part of Letters Patent No. 621,524, dated March 21, 1899.

Application filed June 24, 1898. Serial No. 684,379. (No model.)

*To all whom it may concern:*

Be it known that I, WILLIAM H. GORDON, a citizen of the United States of America, residing at Portland, in the county of Multnomah and State of Oregon, have invented certain new and useful Improvements in Miter-Boxes, of which the following is a full, clear, and exact description, reference being had to the accompanying drawings as a part hereof.

My invention relates to miter-boxes, and has for its object the improvement of the construction thereof, so that a superior miter-box may be made at a small cost, with which a miter can be perfectly cut with an ordinary saw at any angle and to suit all classes of work, one of the principal features of my invention being its simplicity of construction, lightness of weight, and the ready manner in which the faces of the saw-guide when worn or injured may be removed and substituted.

With this end in view the construction of my invention is as illustrated in said accompanying drawings, in which—

Figure 3:
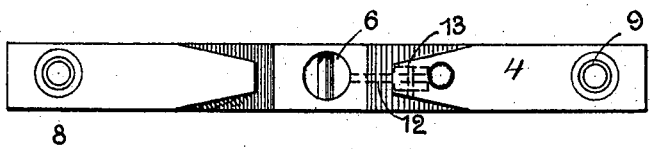
Figure 1:
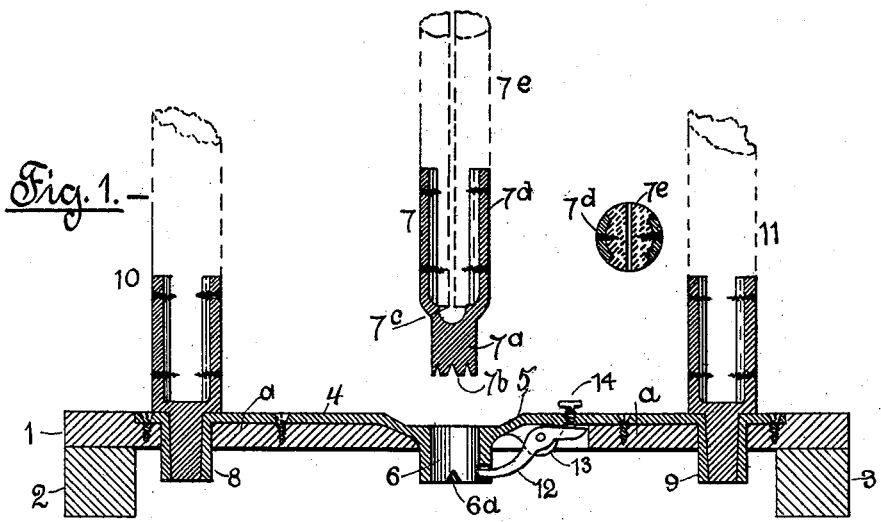
Figure 2:
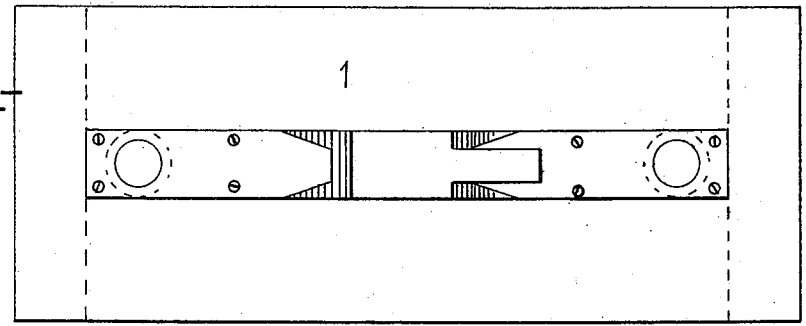
Figure 8:
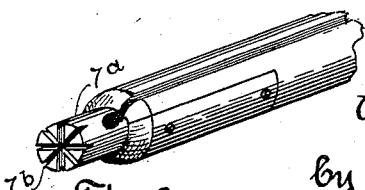

Figure 1 is a central longitudinal vertical section of my device, showing the base on which my saw-guide and work-rests are mounted and also showing such saw-guide and work-rests. Fig. 2 is a plan view of the wooden bed or block on which my device is mounted. Fig. 3 is a plan of the base-plate to be mounted on said bed or block and providing the sockets in which the saw-guide and work-rests are mounted. Fig. 4 is a side elevation of the operative parts of my device removed from the wooden base and so modified in construction as to be adapted to radial adjustment in a vertical line as well as in a horizontal plane. Fig. 5 is a plan of the devices shown in Fig. 4. Fig. 6 is a central longitudinal section of my device removed from its wooden base and illustrates a structural modification in principle like the device shown in Fig. 4. Fig. 7 is a plan of the devices shown in Fig. 6, and Fig. 8 is a perspective detail of the base of the reduced end or journal of the saw-guide.

The numerals designate the parts referred to.

My device is mounted on a wooden bed or block 1, provided at its ends with cleats or rests 2, which serve to hold the block elevated. The upper surface of such block is cut away in part, so as to receive the base-plate 4, to be set down flush into the block and attached thereto. The central part 5 of such bed-plate is depressed and is provided with a socket 6 to receive the base or journal of the saw-guide 7. Said plate 4 is also provided with two other sockets 8 and 9, in which to receive the reduced ends of the posts or work-rests 10 and 11. The socket 6 has a rib or bar $6^a$ at its lower end. If the plate 4 be cast of iron, said rib $6^a$ should consist of a bar of steel cast into the said socket, as a cast-iron rib might not be able to withstand the strain to which it will be subjected in use. The base or journal end $7^a$ is provided with diametrically and radially extending grooves $7^b$, (see Fig. 8,) adapted to be fitted over and engaged by said rib $6^a$, so that thereby said saw-guide may be set at angles of different degrees in a horizontal plane. To fix my saw-guide when adjusted at the proper angle, I provide a lever 12, pivoted between two lugs 13 and entering the side of the socket 6, which lever is adjusted by means of a set-screw 14, so as to cause the lower end of the lever to bear against the journal of the saw-guide and lock the same. While the rib $6^a$ is convenient for ordinary angular adjustment of the saw-guide, yet I am not confined to those angles alone, but, as is above shown, by means of said lever my saw-guide may be adjusted and fixed at any angle.

The construction of the saw-guide 7 and the two standards or work-guides 10 11 is about alike, and by observing the former it will be seen that it comprises a support consisting of a bifurcated socket $7^d$, the base of which terminates in a reduced part or journal $7^a$ and a wooden post $7^e$, inserted and made fast by screws in said socket which the post is adapted to fit. The socket of the saw-guide is further provided with a recess $7^c$ to clear the saw and with the grooves $7^b$, already mentioned, and the wooden post has a diametrical cut or slot in which the saw is operated. By this arrangement in case the wooden post should be injured and no substitute post be handy the workmen could use ordinary flat slats or sticks and arrange and secure these in the said supports, so as to present an even front or face to the work.

As thus far described, my device is adapted only for making cuts at any angle in a horizontal plane. It may be found desirable, however, to be able to make a cut in an angle in a vertical plane as well. To accomplish this, my device is added to and modified, as illustrated in Fig. 4. The socket for the saw-guide is provided with trunnions 15, resting in trunnion-bearings therefor provided in the depressed part of said plate 4, and said socket has an arc-shaped longitudinal flange or member 16, suitably graduated, formed about it, revolving between the two sets of ears 17 18, in which are clamping-screws 19 for engaging said arc-flange. The base-plate 4 is adapted to accommodate all the added mechanism. The lever 12 is best substituted in this form of construction by an ordinary set-screw 20. With a device such as I have last described a double cut can be made at any angle, for the saw-guide can be rotated or turned on its vertical axis to guide the saw obliquely across the board, and the graduated member can be turned to incline the guide to give a cut oblique to the face of the block, thus providing a guide for a double cut upon these two adjustments having been properly made. As the wooden slotted part of the saw-guide is apt to be the more easily injured than the same member of the work-rest and the wooden facing of said saw-guide temporarily substituted by flat sticks, it may be an advantage to make the work-rest of oval shape, as shown at 21 and 22 in Fig. 5.

In the practical manufacture of my invention it may be thought that the construction of my device for adapting the same to a double adjustment and cut might advantageously be modified to correspond to the mechanism illustrated in Fig. 6. In this instance the base-plate is provided with a depending concaved portion 23, the base 23ᵃ of which is slotted and the ends 24 25 of such slot being T-shaped in cross-section.

The socket for the support of the saw-guide is provided with a segmental arc-shaped longitudinal flange 26, provided with gradations and T-shaped keys 27 28 being provided to work in said T-shaped slots. This modified device would be provided with the lever 12 for locking the saw-guide. The T-shaped slots can be dispensed with and the trunnions or pinions only used. Some more slight changes of construction could be made in the different parts without materially detracting from any of the advantages of the invention, and hence I do not limit myself to the precise construction herein shown and described.

Now what I claim is—

1. In a miter-box, in combination, a base or block and supports therefor, a plate as 4 mounted on said block provided with a depressed central portion and dependent sockets 6, 8, and 9, a locking bar or rib as 6ᵃ in the lower end of the socket 6, a vertically-slotted saw-guide journaled in the socket 6, the base of the journal of which saw-guide is provided with a series of diametrically and radially extending slots adapted to be engaged by such locking-bar 6ᵃ, a work-rest journaled in each of the sockets 8 and 9, and means for rigidly securing the saw-guide substantially as set forth.

2. In a miter-box, in combination, a base or block and supports therefor, a plate as 4 mounted on said block provided with a depressed central portion and dependent sockets 6, 8, and 9, a locking-bar as 6ᵃ in the lower end of the socket 6, a saw-guide journaled in the socket 6, the base of the journal of which saw-guide is provided with a series of diametrically and radially extending slots adapted to be engaged by such locking-bar 6ᵃ, a work-rest journaled in each of the sockets 8 and 9, and means for rigidly securing the saw-guide, each of said work-rests comprising a bifurcated socket or support 7ᵈ, and a post affixed therein, the base of such support terminating in a reduced part or journal 7ᵃ, whereby it is mounted in its socket, and the saw-guide being of like construction and having a recess 7ᶜ, and the posts mounted therein being slotted, for receiving the saw, substantially as set forth.

3. In a miter-box in combination, a base or block and supports therefor, a plate as 4 mounted on said block provided with a depressed central portion and dependent sockets 6, 8, and 9, a locking-bar as 6ᵃ, in the lower end of the socket 6, a saw-guide journaled in the socket 6, the base of the journal of which saw-guide is provided with a series of diametrically and radially extending slots adapted to be engaged by such locking-bar 6ᵃ, a work-rest journaled in each of the sockets, 8 and 9, and means for rigidly securing the saw-guide, each of said work-rests comprising a bifurcated socket or support 7ᵈ, and a post affixed therein, the base of such supports terminating in a reduced part or journal 7ᵃ, whereby it is mounted in its socket, and the saw-guide being of like construction and having a recess 7ᶜ, and a post mounted therein being slotted for the receiving of the saw, the inner surface of the walls of such sockets and the peripheral surface of such journals slightly tapering downward, substantially as described.

4. In a miter-box, the combination with a base, of a rocking member, and means for securing said member when suitably adjusted, a socket on said member, a locking-strip carried by the member, and a saw-guide journaled in the socket, and having grooves adapted to receive the locking-strips.

5. In a miter-box, the combination with a base and guides thereon, of a rocking member journaled to the base and adapted to adjustment in a vertical plane, and having portions received in the guides, means for clamping said rocking member in any desired position, a saw-guide, having its lower end rotatably connected to the rocking member and adapted to turn on its vertical axis, and means for holding said saw-guide in any desired position after being turned on its vertical axis.

6. In a miter-box, the combination with a base, of guides secured thereto, of a rocking member journaled to the base and adapted to adjustment in a vertical plane, and having portions received in the guides, means for clamping and holding said member in any desired position, a socket on said rocking member, a vertically-disposed saw-guide having its lower end received in said socket and adapted to turn therein on its vertical axis, and provided at its lower end with radially-disposed grooves, and a locking-bar carried by the rocking member adapted to fit in any of such grooves, and secure it to the guide.

7. In a miter-box, the combination with a base of an arc-shaped rocking member having trunnions journaled in the base and adapted to adjustment in a vertical plane, a tubular socket connected to the rocking member and having a rib as $6^a$, a vertically-disposed saw-guide journaled in the socket and provided with radial grooves in its lower end, which are adapted to receive said rib and means for binding the journal of the saw-guide in its said socket; and means for clamping the rocking member at any desired point.

Signed by me, at the city of Portland, county of Multnomah, State of Oregon, this 4th day of April, 1898.

WILLIAM H. GORDON.

Witnesses:
A. CALEF,
T. J. GEISLER.